United States Patent
Nunes

(10) Patent No.: US 8,447,192 B2
(45) Date of Patent: May 21, 2013

(54) INFRARED RECEIVER CIRCUIT

(75) Inventor: Markus Fuchs Nunes, Konz (DE)

(73) Assignee: Vishay Semiconductor GmbH, Heilbronn (DE)

( * ) Notice: Subject to any disclaimer, the term of this patent is extended or adjusted under 35 U.S.C. 154(b) by 316 days.

(21) Appl. No.: 12/997,920

(22) PCT Filed: Jun. 10, 2009

(86) PCT No.: PCT/EP2009/004204
§ 371 (c)(1),
(2), (4) Date: Mar. 9, 2011

(87) PCT Pub. No.: WO2009/156063
PCT Pub. Date: Dec. 30, 2009

(65) Prior Publication Data
US 2011/0158657 A1 Jun. 30, 2011

(30) Foreign Application Priority Data
Jun. 23, 2008 (DE) .......................... 10 2008 029 620

(51) Int. Cl.
*H04B 10/06* (2006.01)
(52) U.S. Cl.
USPC .......................................... 398/209; 398/210
(58) Field of Classification Search
USPC .................................................. 398/209, 210
See application file for complete search history.

(56) References Cited

U.S. PATENT DOCUMENTS

| | | | |
|---|---|---|---|
| 6,118,567 A * | 9/2000 | Alameh et al. | 398/191 |
| 6,356,375 B1 * | 3/2002 | Holcombe | 398/209 |
| 2003/0171108 A1 * | 9/2003 | Eichin et al. | 455/307 |
| 2005/0025495 A1 | 2/2005 | Devine et al. | |
| 2005/0053378 A1 | 3/2005 | Stanchfield et al. | |
| 2007/0285155 A1 | 12/2007 | Yano et al. | |
| 2008/0013962 A1 * | 1/2008 | Nishikawa | 398/202 |

FOREIGN PATENT DOCUMENTS

| | | |
|---|---|---|
| EP | 1 238 468 A1 | 9/2002 |
| EP | 1 238 468 B1 | 9/2002 |
| WO | WO-02/13403 A1 | 2/2002 |
| WO | WO-2005/046094 A1 | 5/2005 |

OTHER PUBLICATIONS

German Search Report dated Feb. 12, 2009. DE 10 2008 029 820.1.

* cited by examiner

*Primary Examiner* — Nathan Curs
(74) *Attorney, Agent, or Firm* — Gifford, Krass, Sprinkle, Anderson & Citkowski, P.C.

(57) ABSTRACT

The invention relates to an infrared receiver circuit for processing a carrier-modulated infrared signal, comprising an amplification circuit and a demodulator. A comparator is provided, which is designed to digitize the output signal of the amplification circuit or of a band pass filter connected downstream of the amplification circuit by comparison to a threshold value in order to create a pulse train signal. The receiver circuit comprises a logic circuit, which is designed to link the pulse train signal of the comparator and the output signal of the demodulator logically to each other in order to extract an additional output signal corresponding to the infrared signal from the pulse train signal.

6 Claims, 3 Drawing Sheets

INFRARED RECEIVER CIRCUIT

CROSS-REFERENCE TO RELATED APPLICATIONS

Figure 1:
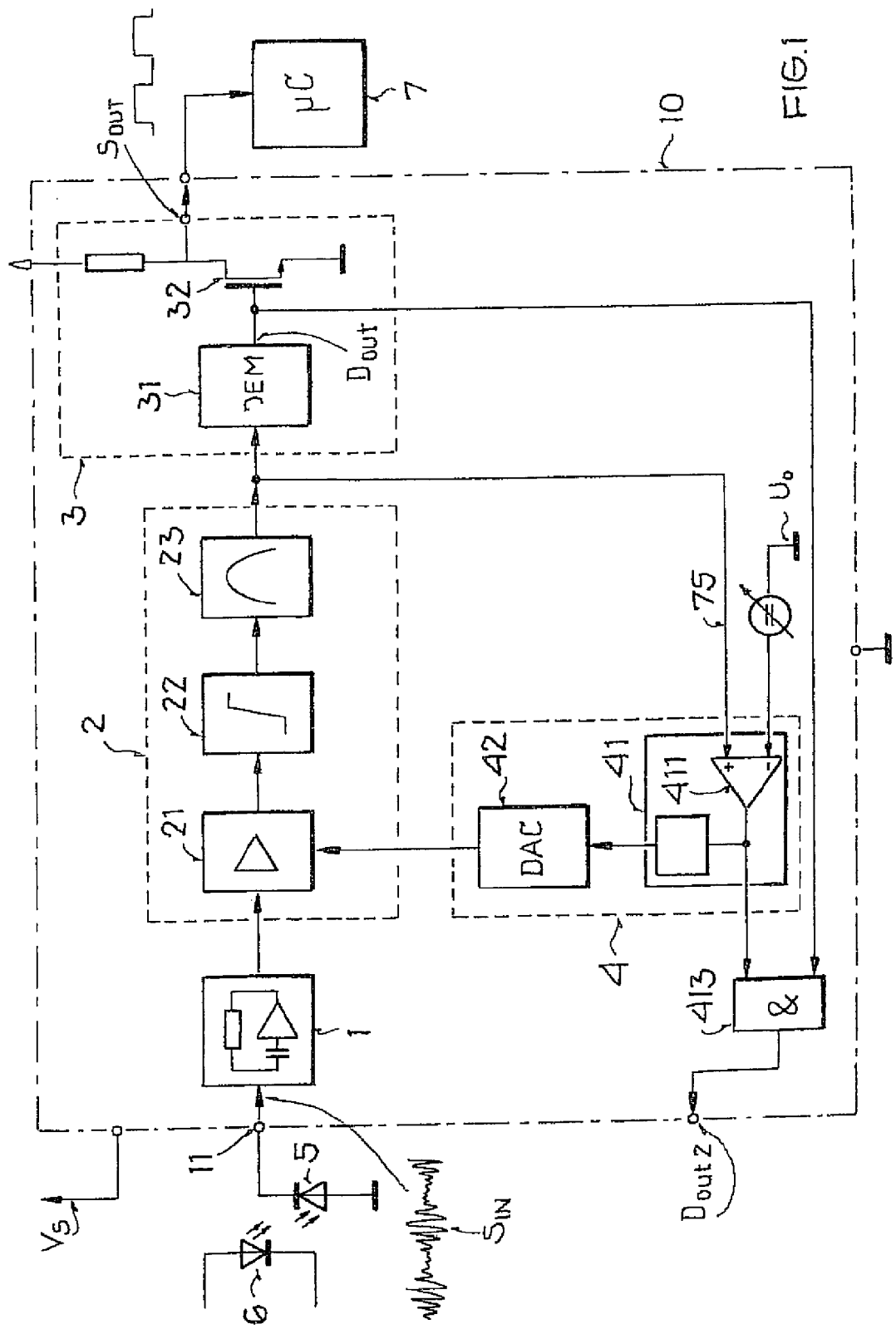

This application is the U.S. national phase of PCT/EP2009/004204 filed Jun. 10, 2009, which claims priority of German Patent Application No. 10 2008 029 620.1 filed Jun. 23, 2008.

The present invention relates to an infrared receiver circuit for the processing of a carrier modulated infrared signal, comprising an amplifier circuit and a demodulator connected downstream of the amplifier circuit, with a comparator being provided which is adapted to digitize the output signal of the amplifier circuit or of a band-pass filter connected downstream of the amplifier circuit by comparison with a threshold value to generate a pulse train signal.

To generate such an infrared signal (IR signal), a control command or other data are modulated onto a carrier signal, for example while using amplitude modulation or a digital modulation process. Such infrared signals are, for example, transmitted by remote control units and can serve for the control of television sets or DVD appliances. A photodiode is usually arranged at the respective appliance and its output is connected to an input of the named infrared receiver circuit (IR receiver circuit). The photodiode converts the signal transmitted and received in the infrared spectral range into electrical signals (photocurrent). These electrical signals are amplified in the IR receiver circuit, preferably band-pass filtered and subsequently demodulated, so that the control command or other data set encoded in the infrared signal can be output at an output of the IR receiver circuit in the faun of an already demodulated output signal.

Specifically, such an IR receiver circuit can contain an automatic amplification regulation by which the amplification of the IR receiver circuit can be adjusted in accordance with the reception quality, whereby a high sensitivity for the received signals is achieved, but simultaneously interference influences, which originate from extraneous light, for example, are largely suppressed.

The automatic amplification regulation is built up of a regulation amplifier and a regulation circuit with a regulation logic part in EP 1 238 468 B1 whose disclosure content is herewith included in the content of the present application. For this purpose, the regulation logic part has a comparator (not explicitly described in EP 1 238 468 B1) which compares the output signal of a band-pass filter with a regulation threshold value and generates a rectangular pulse when the output signal of the band-pass filter exceeds the regulation threshold value. The output signal of the comparator controls a monoflop (not explicitly described in EP 1 238 468) which is set in each case for a preset time when the comparator generates such a rectangular pulse in order hereby to continuously reduce the amplification of the regulation amplifier beyond the preset time. As soon as the monoflop is no longer set, the amplification of the regulation amplifier is again continuously increased.

Generally different encoding processes and modulation processes as well as the use of different carrier frequencies are known for the initially described infrared signal. It is common to the known different processes that optical interference influences are suppressed. It is thus also possible, for example, to control a plurality of appliances in spatial proximity to one another by means of different remote control units without any mutual influencing arising. It is ensured in other words that the transmission of a remote control signal normally only results in a corresponding control of the associated appliance (e.g. television set) and is not also interpreted as a control command in an unwanted manner by a further appliance (e.g. DVD player) which, after all, has a remote control unit of its own associated with it.

It can, however, also be desired to control a plurality of appliances by means of one single universal remote control unit so that there is no need to provide a separate associated remote control unit for each of the existing appliances. This can in particular be realized by an IR reception module of a so-called multimedia personal computer which can, for example, in addition to a television set also control a DVD player or a set-top box for the television set, with originally a respective separate remote control unit having been provided for these further appliances. Since the IR reception module of the multimedia personal computer is optically connected to the IR receivers of the further appliances by means of a so-called blaster unit or infrared transmitters provided therein, a remote control is possible via the universal remote control unit and the IR reception module. The teaching of the control commands required for this purpose can take place using the infrared remote control signals of the originally present remote control units of the further appliances, i.e. the IR reception module should be able to reproduce the taught control commands in a manner as true to the original as possible.

Independently of the wish for a single universal remote control unit, it can also be desired that the initially named IR receiver circuit is a component of a so-called extender to amplify the received infrared signal and to output it again in the amplified form—and in particular in the still modulated form.

It is the object of the invention to provide an IR receiver circuit of the initially named kind which makes it possible in a simple manner to provide the aforesaid functions, in particular also in the presence of an interference field.

This object is satisfied by an IR receiver circuit having the features of claim 1, and in particular in that the receiver circuit includes a logic circuit which is adapted to link the pulse train signal of the comparator and the output signal of the demodulator logically with one another to extract an additional output signal corresponding to the infrared signal from the pulse train signal.

If an infrared signal is received by the IR receiver circuit which is encoded by a specific sequence of so-called bursts, for example by means of pulse code modulation (PCM), two-phase marking or pulse width modulation (PWM), the named comparator generates a digital pulse train signal during the reception of each of the bursts which has the frequency of the carrier signal of the infrared signal since each of the oscillations of each of the bursts exceeds the comparator threshold value which has been selected to be correspondingly low. The received infrared signal is hereby mapped as a still modulated digital output signal. This output signal is provided in addition to the output signal of the demodulator which is usually output by the IR receiver circuit.

In order in this respect to ensure that the pulse train signal generated by the comparator actually also is a signal which corresponds to the infrared signal—that is to the wanted signal—the pulse train signal is only used for the generation of the additional output signal when, at the same time, the reception of a burst of an infrared signal is determined on the basis of the output signal of the demodulator.

The pulse train signal extracted in this manner can then be used for the initially explained purposes, for example as an extender function.

The signal supplied to the named comparator for the threshold value comparison is taken from the signal processing path of the IR receiver circuit after a signal amplification and in particular after a band-pass filtering or any other further signal processing, but still before the final demodulation.

The logic circuit can be a simple logic gate, in particular an AND gate. One or each of the two inputs of the logic gate can be an inverting input so that the pulse sequence signal of the comparator and/or the output signal of the demodulator is ultimately supplied to the logic gate as an inverted signal. The named additional output signal of the receiver circuit is in this case therefore substantially digital (discrete signal level).

Alternatively to a digital logic circuit, the logic circuit can be made as an analog logic circuit, with the pulse train signal of the comparator being modulated onto the carrier signal of the infrared signal in the named additional output signal and being essentially sinusoidal. The additional output signal is in this case therefore analog or only quasi-digital. For example, in a simple embodiment, the named logic circuit can have a transistor which is deliberately not overmodulated.

Provision can generally be made that the pulse train signal generated by the comparator is used only for the logical linking with the output signal of the demodulator. In other words, the named comparator can serve exclusively for the generation of the explained additional output signal. The amplifier circuit, however, preferably includes a regulation amplifier, with a regulation logic part connected to the output of the amplifier circuit or of the band-pass filter being provided for the automatic amplification regulation of the regulation amplifier, and with the comparator being a component of the regulation logic part anyway present. In this case, a comparator already present for the purpose of the automatic amplification regulation such as has been explained above in connection with the prior art can therefore be used to realize the invention. In particular in this case, the named threshold value of the comparator corresponds to a value different from the quiescent level of the output signal of the amplifier circuit.

In accordance with another embodiment of the invention, in contrast, the threshold value of the comparator corresponds at least substantially to the quiescent level of the output signal of the amplifier circuit or of the band-pass filter (threshold zero). This is advantageous since then a pulse train signal of maximum length can be extracted whose duration corresponds particularly well to the duration of the associated burst, as will become clear in connection with the following description of the Figures.

It is preferred under this aspect if the named threshold value of the comparator is at least lower than that threshold value which is taken into account in the demodulator for the demodulation of the infrared signal.

Further advantageous embodiments of the invention are set forth in the following description of the Figures, in the drawing and in the dependent claims.

Figure 2:
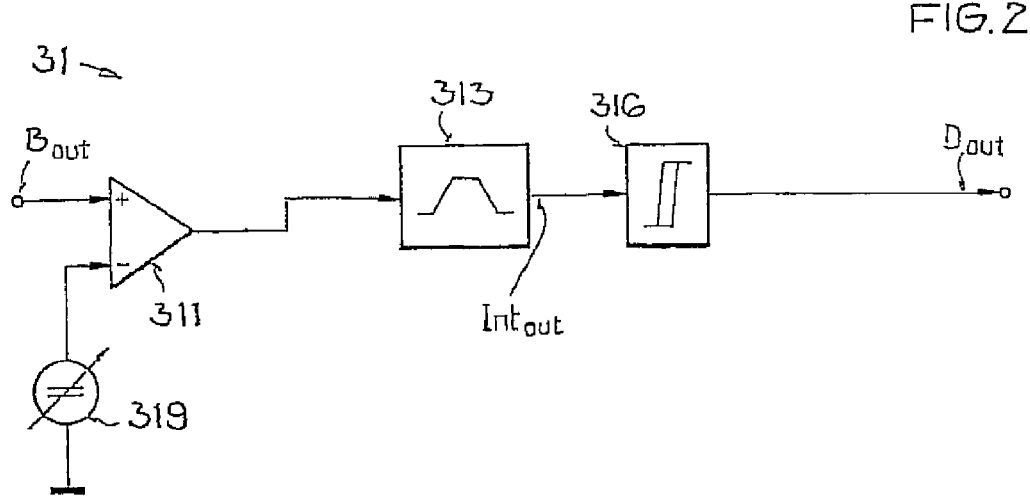
Figure 3:
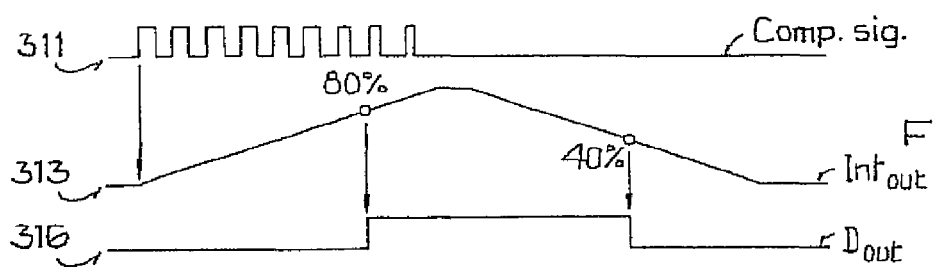
Figure 4:
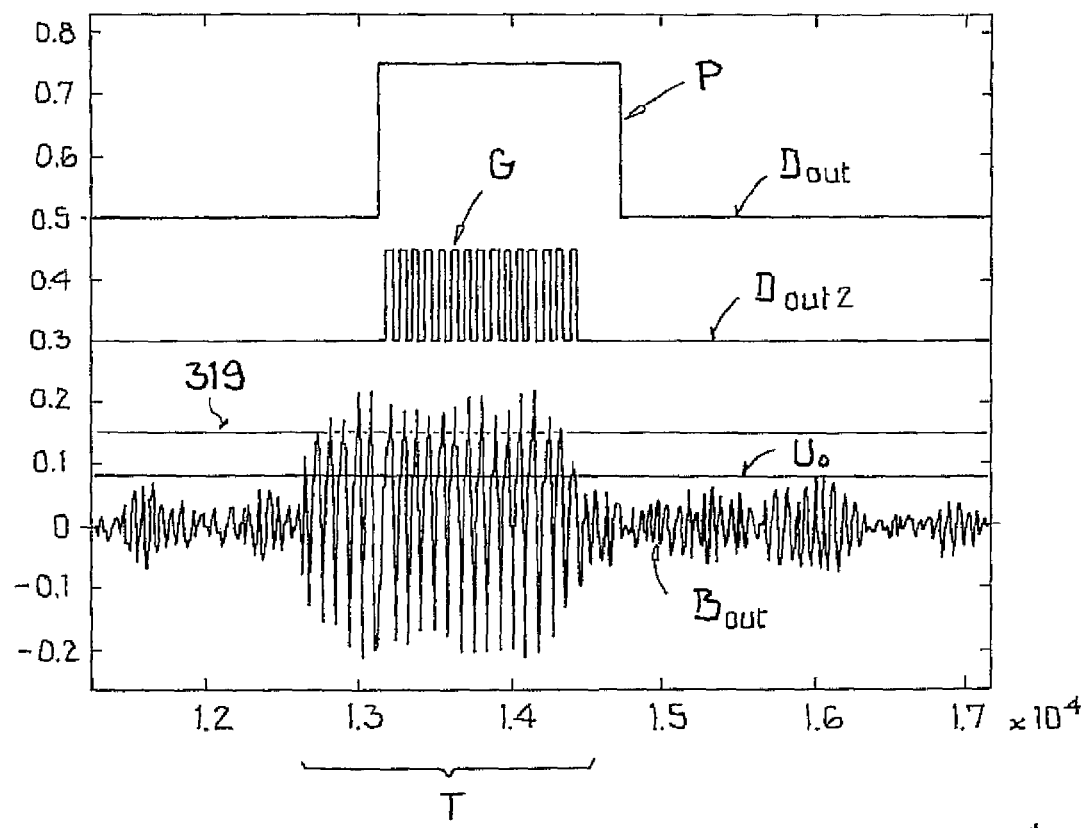

The invention will be explained only by way of example in the following with reference to the drawing. There are shown in it:

FIG. 1 a block diagram of an IR receiver circuit in accordance with the invention;

FIG. 2 a block diagram of a demodulator of the IR receiver circuit in accordance with FIG. 1;

FIG. 3 a logic diagram for the explanation of the function of the demodulator in accordance with FIG. 2; and FIG. 4 different signals generated by the IR receiver circuit in accordance with FIG. 1.

FIG. 1 shows a block diagram of an IR receiver circuit 10 and of its surroundings. Carrier-modulated data transmitted by an optical transmission diode 6 are received as infrared pulses by a photodiode 5. The infrared pulses incident on the photodiode 5 with a carrier frequency of, for example, 38 kHz are converted there into electrical current signals $S_{IN}$ which are then applied to an input connector 11 of the IR receiver circuit 10. These electrical current signals $S_{IN}$ are supplied to an input circuit 1 acting as a transimpedance amplifier which amplifies the current signals $S_{IN}$ and converts them into voltage signals. In this respect, the generated voltage must be large enough to make the noise portion negligible in the downstream signal preparation stages. In the downstream signal preparation part 2, these voltage signals are amplified again by means of a regulation amplifier 21, are limited by a limiter 22 and are subsequently filtered in a band-pass filter 23.

The signal limitation by means of the limiter 22 is necessary to avoid overmodulation of the downstream band-pass filter 23 and to suppress pulse-like interference which enters into the IR receiver circuit 10 e.g. via a supply connector $V_S$. The band-pass filtered signal $B_{out}$ is demodulated in an evaluation part 3 adjoining the signal preparation part 2 by means of a demodulator 31 and is made available to a microcontroller 7 for further processing via a driver transistor 32 with an associated load resistance as the output signal $S_{out}$.

To optimize the amplification of the wanted signal transmitted by the transmission diode 6 and thus to optimize the sensitivity of the IR receiver circuit, the IR receiver circuit 10 has a regulation circuit 4 which supplies regulation signals to the regulation amplifier 21 and which in turn receives the output signal $B_{out}$ of the band-pass filter 23 via a line 75. It is the object of this regulation circuit 4 to optimize the signal-to-noise ratio in that the amplification of the input signal $S_{IN}$ is changed in dependence on the magnitude of the input signal. The regulation circuit 4 is made up of a regulation logic part (automatic gain control, AGC) 41 and of a digital-to-analog converter (DAC) 42. The regulation logic part 41 separates the wanted signals from the interference signals and sets the amplification for the wanted signals to a level which is as high as possible so that a high sensitivity for the wanted signals is achieved. At the same time, interference influences such as extraneous light are reduced. The digital-to-analog converter 42 converts the digital amplification information generated by the regulation logic part 41 into an analog control voltage for the regulation amplifier 21.

The function of the demodulator 31 will be explained in more detail in the following with reference to FIG. 2 and to the associated diagram in accordance with FIG. 3.

In accordance with FIG. 2, the output signal $B_{out}$ originating from the band-pass filter 23 is digitized by means of a comparator 311 whose threshold voltage 319 is a fixedly set reference value which can, however, also be set over a plurality of stages in dependence on the signal with respect to the band-pass filter quiescent level. The digital signals of the comparator 311 present as pulse trains $Comp_{sig}$ (see diagram 311 in FIG. 3) are integrated in an analog integrator circuit 313. This integrator 313 knows the states CHARGE and DISCHARGE up to the maximum gain limits 0% and 100% respectively, whereby a limited integral voltage curve (see diagram 313 in FIG. 3) is generated as the output signal $Int_{out}$. A Schmitt trigger 316 is provided at the output of the integrator 313. In the present application example, the input and output switching thresholds for the Schmitt trigger 316 are at 80% and 40% respectively (see diagram 316 in FIG. 3), i.e. the positive flank of the rectangular demodulation output signal $D_{out}$ is generated on a rising integrator value of 80% of the maximum value and the negative flank is generated on a feedback value of the integrator value of 40%.

For the amplification regulation of the regulation amplifier 21, the regulation logic part in particular includes a comparator 411 (FIG. 1) at whose one input the output signal $B_{out}$ of the band-pass filter 23 is applied and at whose other input a regulation threshold value $U_0$ is applied. The regulation takes place in the manner as is explained above in connection with the prior art.

Independently of the use of the output signal of the comparator 411 for the amplification regulation, the output of the comparator 411 is connected to an input of an AND gate 413 whose other input is connected to the output of the demodulator 31 (output signal $D_{out}$).

The effect of the AND gate 413 is shown in FIG. 4 in which the output signal $D_{out}$ of the demodulator 31, the output signal $D_{out2}$ of the AND gate 413 and the output signal $B_{out}$ of the band-pass filter 23 are shown, with the regulation threshold $U_0$ being indicated for the output signal $B_{out}$ of the band-pass filter 23.

The output signal $B_{out}$ of the band-pass filter 23 in the region T corresponds to a burst of a remote control signal received by the IR receiver circuit 10. In the region T, each of the oscillations of the output signal $B_{out}$ of the band-pass filter is above the regulation threshold value $U_0$ so that a regular pulse train signal (not shown separately) formed in the manner of the $Comp_{sig}$ signal 311 of FIG. 3 is generated by the comparator 411 in the region T and has the frequency of the output signal $B_{out}$ of the band-pass filter 23 and thus the frequency of the carrier signal of the remote control signal.

The pulse train signal generated by the comparator 411 is ANDed with the output signal $D_{out}$ of the demodulator 31 by means of the AND gate 413 to generate the output signal $D_{out2}$ which then likewise has the frequency of the carrier signal of the remote control signal. The ANDing with the output signal $D_{out}$ of the demodulator 31 is carried out to exclude pulses which are not based on a remote control signal, but rather arise due to the continuous regulation activity of the regulation amplifier 21 and of the regulation circuit 4 with the regulation logic part 41 so that a falsification of the output signal $D_{out2}$ corresponding to the remote control signal can be prevented.

The duration of the pulse group G of the output signal $D_{out2}$ shown in FIG. 4 is in this respect somewhat shorter than the duration of the rectangular signal P of the output signal $D_{out}$ of the demodulator 31, with the pulse group G and the rectangular signal P being based on the same burst. The comparatively shorter duration of the pulse group P is due to the fact that the rectangular signal P of the demodulator 31 lags behind the underlying burst and the pulse train signal generated by the comparator 411 due to the use of the integrator 313 and of the Schmitt trigger 316 and of the settings selected for it. However, this is not further disadvantageous since a burst may usually have a certain tolerance with respect to its duration.

The use of the comparator 411 for the generation of the pulse train signal supplied to the AND gate has the advantage that Already present IR receiver circuits can be used which are as a rule made as semiconductor components.

Alternatively, a separate comparator can also be provided which compares the output signal of the band-pass filter 23 with the quiescent level (zero level) of the output signal of the band-pass filter 23 or with a level differing only slightly from the quiescent level. Despite the lagging behind of the rectangular signal P with respect to the underlying burst, a pulse group G extending over the full duration of the rectangular signal P of the output signal $D_{out}$ of the demodulator 31 can hereby be generated since the remote control signal or its carrier frequency can also be detected between two bursts.

It is generally also possible to use the pulse train signal $Comp_{sig}$ generated by the comparator 311 for the ANDing with the output signal $D_{out}$ of the demodulator 31.

The present invention makes it possible in a simple manner to provide a signal which maps a remote control signal.

The invention claimed is:

1. An infrared receiver circuit for the processing of a carrier-modulated infrared signal, comprising an amplifier circuit and a demodulator connected downstream of the amplifier circuit, wherein a comparator is provided which is adapted to compare an output signal ($B_{out}$) of the amplifier circuit or of a band-pass filter connected downstream of the amplifier circuit with a threshold value ($U_0$) to generate a digital pulse train signal therefrom, characterized in that the receiver circuit includes a logic circuit which is adapted to link the pulse train signal of the comparator and an output signal ($D_{out}$) of the demodulator logically with one another to extract an additional output signal ($D_{out2}$) corresponding to the infrared signal from the pulse train signal.

2. A receiver circuit in accordance with claim 1, characterized in that the logic circuit is made as a logic gate comprising an AND gate.

3. A receiver circuit in accordance with claim 1, characterized in that the logic circuit is made as an analog logic circuit comprising a transistor which is not completely set to maximum gain.

4. A receiver circuit in accordance with claim 1, characterized in that the threshold value ($U_0$) is lower than a threshold value which is taken into account for the demodulation of the infrared signal in the demodulator.

5. A receiver circuit in accordance with claim 1, characterized in that the amplifier circuit includes a regulation amplifier, with a regulation logic part connected to the output of the amplifier circuit or of the band-pass filter being provided for the automatic amplification regulation of the regulation amplifier, and with the comparator being a component of the regulation logic part.

6. A receiver circuit in accordance with claim 1, characterized in that the threshold value ($U_0$) corresponds to the quiescent level of the output signal ($B_{out}$) of the amplifier circuit or of the band-pass filter.

* * * * *